Nov. 26, 1968  J. S. FRANCIS  3,413,018

QUICK CONNECT COUPLING

Filed June 2, 1966

INVENTOR
Joseph S. Francis,
by *Thos. A. Benny jr*
Atty.

3,413,018
QUICK CONNECT COUPLING
Joseph S. Francis, 15134 Irving St., Dolton, Ill. 60419
Filed June 2, 1966, Ser. No. 554,831
5 Claims. (Cl. 285—86)

ABSTRACT OF THE DISCLOSURE

A coupling for disconnectably connecting two elements wherein provision is made for retaining the elements in coupled condition by endwise coupling movement combined with rotary movement to bring the elements into coupling retained engagement against endwise disconnection; with provision of means for snap retaining the elements in their relatively rotated condition, and in coupled relationship, together with provision for releasing such retaining means to permit rotation to a disengaging position.

---

This invention relates to improvements in quick detachable couplings for hose, pipe and other articles requiring a coupling that is adapted for quick connection and disengagement and also requiring positive engagement with great strength.

It is one of the objects of the invention to provide a coupling of the type referred to, comprising of a male and female member adapted to be securely coupled by inserting the male member into the female member rotating the male member and then having the male member firmly and securely locked in place.

A further object of the invention is to provide a coupling of this type that may be readily and conveniently uncoupled.

A further object of the invention is to provide a coupling of the type referred to that will be so constructed that there is an almost absolute positivity that the parts will not become accidentally uncoupled.

Other objects of the invention and the features of novelty will be apparent from the following description taken in connection with the accompanying drawings wherein.

Figure 1:
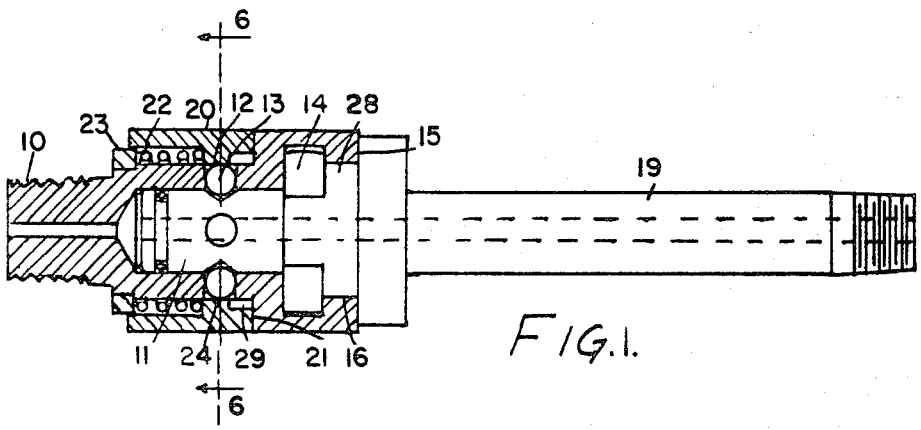
FIG. 1 is an elevational view partly in longitudinal section of a coupling embodying the invention.
Figure 2:
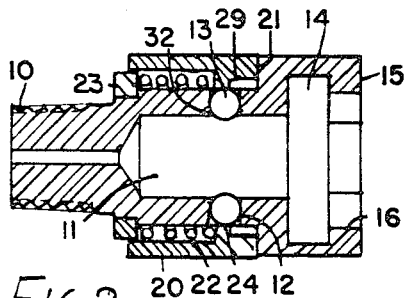
FIG. 2 is a composite view of the female member of a coupling, certain parts being shown in elevation and certain parts in longitudinal section.

Referring to the invention as illustrated in FIGS. 1 thru 6, 10 indicates the female member of the coupling which is provided with a bore 11 and one or more holes 12 communicating with the bore 11. Holes 12 are tapered or are provided with a shoulder 32 to retain ball 13 of which there are one or more, the same number as holes 12, to prevent them from falling out or being lost. In addition to having a bore 11, the female member 10, has a groove 14 machined a longitudinal distance from the face 15 of female member 10 to form an internal shoulder 16. This shoulder 16 has a plurality of spline openings 17 machined in it to provide openings to receive similar spline projections 18 on the male member 19.

Also slidably arranged on the outside of female member 10 is a sleeve 20 which is held against a shoulder 21 by spring 22 which is retained by washer 23 which is staked or otherwise fastened to female member 10. Internal shoulder 24 rests on balls 13 causing them to project into bore 11, and when the coupling members are assembled the balls 13 will project into recesses 27 hereinafter described, in the male member 19.

Figure 3:
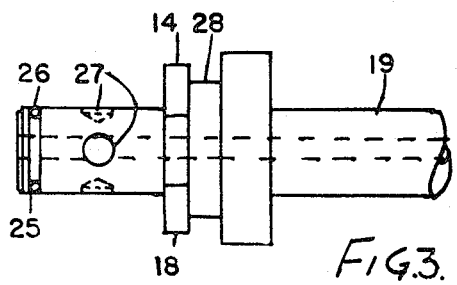
FIG. 3 is an elevation of the male member—the coupling in a position to be connected to the female member.
Figure 4:
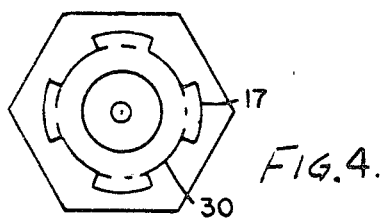
FIG. 4 is an end view of the female member in FIG. 2.
Figure 5:
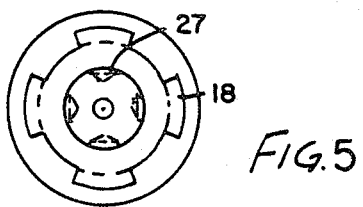
FIG. 5 is an end view of the male member in FIG. 3.
Figure 6:
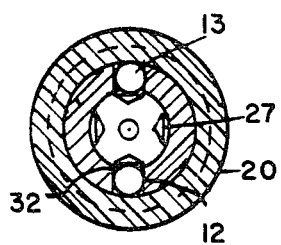
FIG. 6 is a transverse section on line 6—6 of FIG. 1.

Referring to FIGURE 3, the male member 19 is provided with a groove 25 wherein is retained an O ring 26 which is to later provide a seal between male member 19 and female member bore 11. Male member 19 is provided with one or more recesses 27. The male member 19 also has a number of spline projections 18 and has a groove 28 machined in, which in longitudinal dimension closely fits internal shoulder 16.

To couple, the male member 19 is pushed into and toward the rear of female member 10 located angularly so that spline projections 18 are aligned with spline openings 17. Sleeve 20 is also moved rearwardly compressing spring 22. Male member 19 moves into bore 11 and contacts balls 13 which move outwardly into recess 29 of sleeve 20 and internal shoulder 16 of female member 10 is longitudinally aligned with groove 28 of male member 19. Male member 19 is rotated until spline projections 18 are directly in the rear of spline projections 30 of internal shoulder 16. Sleeve 20 has been released and is urged forward by spring 22 against balls 13 which are forced into recesses 27. Balls 13 are now in recesses 27 and shoulder 24 rests on balls 13 and retains them. This action in turn locks male member 19 in angular position so that spline projections 18 remain behind spline projections 30 and all forces tending to separate the coupling members are resisted by the strength of these splines.

To uncouple the sleeve 20 is moved rearwardly against the spring 22 to place recess 29 over balls 13. At this point male member 19 may be rotated as balls 13 will move out of recesses 27 into recess 29 until spline projections 18 are in line with spline openings 17 and male member 19 may be withdrawn.

My invention provides a positive engagement of this type of coupling and gives full assurance that uncoupling will not take place and that the coupling will have great strength inherent in the physical characteristics of the coupling metals.

The invention may be embodied in other specific forms without departing from the spirit or essential characteristics thereof. The present embodiments are therefore to be considered as illustrative and not restrictive, the scope of the invention being indicated in the appended claims rather than in the foregoing description, and all changes which come within the meaning and range of equivalency of the claims are therefore intended to be embraced therein.

I claim:

1. A coupling comprising in combination; a female cylindrical element provided with a cylindrical socket extending inwardly from one end, and provided with a flange-like cylindrical portion extending axially beyond such socket portion and of diameter greater than the outer surface of such socket portion, said extension being provided with an inwardly radially extending lug having a radially extending face for engagement by a radially extending face of a companion male element lug; the cylindrical wall of said socket being provided with a locking-ball-receiving radially-extending through passage; a locking-ball seated into such through passage, and of diameter greater than the thickness of the socket wall, said locking-ball extending radially outward beyond the outer surface of the female element when the position of such locking-ball within the through passage is such that the surface of the ball reaches inwardly to a radius of the female element equal to the radius of the socket; a ball-controlling sleeve slidably mounted on the outer surface of the cylindrical socket wall, and including a ball-controlling part constituted to engage the outwardly extending portion of the ball when such sleeve element is shifted axially of the female element to a ball-locking position to force and retain the ball inwardly for projection into the socket, and to non-engage the ball when such sleeve is shifted away from such ball-engaging position to permit the ball to extend radially outward beyond the outer surface of the socket wall; together with a male element including an end portion of size to fit into the socket, and an outwardly extending lug on the male element adapted to engage the lug engaging face of the female element lug when the end portion of the male element is sealed into the socket of the female element and in rotated position for axial alignment of the lugs with each other; together with a recess in the socket engaging end portion of the male element, said recess being located at a position distant from the end of the male element and in angular position with respect to the male element lug, such that the ball of the female element seats into the recess of the male element when the lug engaging surfaces of the male and female lugs are in facial engagement with each other and with the outer surface of the ball in surface alignment with the outer surface of the socket wall; whereby when the male and female elements are in such engagement with each other, positioning of the sleeve ball-controlling part in axial alignment with the ball-receiving radial opening through the socket wall closes such radial opening against outward movement of the ball from the recess of the male element.

2. A coupling as defined in claim 1; together with spring means in connection with the ball-controlling sleeve urging such sleeve to axial alignment with the ball-receiving radial opening of the socket wall.

3. A coupling as defined in claim 1; wherein there is a plurality of the inwardly radially extending lugs of the flange-like cylindrical portion of the female element, equally spaced apart around such flange-like cylindrical portion, and wherein there are outwardly extending lugs of the male element, spaced apart equally from each other, and corresponding to the inwardly radially extending lugs of the female element; wherein the spacings between the inwardly radially extending lugs of the female element are of size sufficient to allow the outwardly extending lugs of the male element to move axially through such spacings, and wherein the spacings between the outwardly extending lugs of the male element are of size sufficient to allow the inwardly extending lugs of the female element to simultaneously move axially through such spacings.

4. A coupling as defined in claim 3; wherein there are provided recesses in the socket engaging end portion of the male element corresponding to the plurality of outwardly extending lugs of the male element.

5. A coupling as defined in claim 1; wherein the through passage in the cylindrical wall of the socket of the female element is of tapered size from a larger size at its socket end to a smaller size at its radially outer end, and wherein the ball is of diameter larger than the size of the outer end of the through passage; together with means in connection with the wall of the through passage to retain the ball against disengagement from the through passage prior to engagement of the male element into the socket of the female element.

References Cited

UNITED STATES PATENTS

| 797,796 | 8/1905 | Derlin | 285—376 X |
| 2,290,215 | 7/1942 | Stenberg. | |
| 2,613,089 | 10/1952 | Maiman | 285—86 |
| 3,162,470 | 12/1964 | Davidson et al. | 285—86 |
| 3,260,541 | 2/1966 | Sadler et al. | 287—53 |
| 3,265,408 | 8/1966 | Dickie | 285—316 X |

FOREIGN PATENTS

| 10,199 | 5/1907 | Great Britain. |
| 817,977 | 8/1959 | Great Britain. |

CARL W. TOMLIN, *Primary Examiner.*

R. G. BERKLEY, *Assistant Examiner.*